(12) United States Patent
Rice et al.

(10) Patent No.: US 8,875,098 B2
(45) Date of Patent: Oct. 28, 2014

(54) WORKFLOW ENGINE FOR EXECUTION OF WEB MASHUPS

(75) Inventors: Timothy S. Rice, Bellevue, WA (US); Andrew R. Sterland, Seattle, WA (US); Patrick Chi Wai Wong, Bellevue, WA (US); Adam D. Nathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 12/273,454

(22) Filed: Nov. 18, 2008

(65) Prior Publication Data

US 2010/0125826 A1   May 20, 2010

(51) Int. Cl.
*G06F 9/44* (2006.01)
*G06F 17/30* (2006.01)

(52) U.S. Cl.
CPC .............................. *G06F 17/30867* (2013.01)
USPC ........................... 717/120; 717/107; 717/109

(58) Field of Classification Search
None
See application file for complete search history.

(56) References Cited

U.S. PATENT DOCUMENTS

| | | | | |
|---|---|---|---|---|
| 4,885,684 | A * | 12/1989 | Austin et al. ................ | 717/149 |
| 5,500,881 | A * | 3/1996 | Levin et al. .................. | 717/141 |
| 5,987,422 | A * | 11/1999 | Buzsaki ....................... | 705/7.13 |
| 6,857,130 | B2 * | 2/2005 | Srikantan et al. ............. | 725/93 |
| 6,938,240 | B2 * | 8/2005 | Charisius et al. ............ | 717/104 |
| 7,346,902 | B2 * | 3/2008 | Dutt et al. ................... | 717/149 |
| 7,350,188 | B2 | 3/2008 | Schulz | |
| 7,493,594 | B2 * | 2/2009 | Shenfield et al. ............ | 717/109 |
| 7,522,100 | B2 * | 4/2009 | Yang et al. ................ | 342/357.68 |
| 7,543,269 | B2 * | 6/2009 | Krueger et al. ............... | 717/109 |
| 7,606,824 | B2 * | 10/2009 | Sanabria et al. ............. | 705/7.26 |
| 7,606,832 | B2 * | 10/2009 | Chafle et al. ................ | 1/1 |
| 7,631,291 | B2 * | 12/2009 | Shukla et al. ................ | 717/107 |
| 7,657,868 | B2 * | 2/2010 | Shenfield et al. ............ | 717/109 |
| 7,765,532 | B2 * | 7/2010 | Dutt et al. ................... | 717/149 |
| 7,814,404 | B2 * | 10/2010 | Shenfield .................... | 715/200 |
| 7,865,835 | B2 * | 1/2011 | Farahmand et al. .......... | 715/763 |
| 7,870,482 | B2 * | 1/2011 | Gnech et al. ................. | 715/239 |

(Continued)

OTHER PUBLICATIONS

Rosenberg, et al., "Composing RESTful Services and Collaborative Workflows", Sep. 2008, IEEE Internet Computer; [retrieved on Jan. 23, 2012]; Retrieved from Internet <URL:http://ieeexplore.ieee.org/stamp/stamp.jsp?tp=&arnumber=4620091>; pp. 24-31.*

(Continued)

*Primary Examiner* — Tuan Q. Dam
*Assistant Examiner* — Xi D Chen
(74) *Attorney, Agent, or Firm* — Kevin Sullivan; Leonard Smith; Micky Minhas

(57) ABSTRACT

A software-implemented workflow engine is described that executes a Web mashup within the context of a Web browser running on a computer. The workflow engine is configured to parse a Web mashup definition obtained from a remote server to identify distinct units of execution within the Web mashup, referred to as components. The workflow engine is further configured to obtain programming logic and metadata associated with each type of component identified in the Web mashup definition from the remote server and to use such information to generate executable versions of the identified components. Finally, the workflow engine is configured to run each of the executable components, thereby executing the Web mashup. The workflow engine is configured to manage the order of execution of each of the executable components so that the Web mashup runs in an optimized and reliable fashion.

20 Claims, 6 Drawing Sheets

(56) References Cited

U.S. PATENT DOCUMENTS

| | | | |
|---|---|---|---|
| 7,921,408 B2* | 4/2011 | Shenfield et al. | 717/107 |
| 7,921,409 B2* | 4/2011 | Shepard et al. | 717/120 |
| 7,941,546 B2* | 5/2011 | Rice et al. | 709/227 |
| 7,941,784 B2* | 5/2011 | Shenfield et al. | 717/107 |
| 8,055,773 B2* | 11/2011 | Breiter et al. | 709/226 |
| 8,073,857 B2* | 12/2011 | Sreekanth | 707/756 |
| 8,132,149 B2* | 3/2012 | Shenfield et al. | 717/109 |
| 8,141,038 B2* | 3/2012 | O'Connell et al. | 717/120 |
| 8,156,470 B2* | 4/2012 | Krueger et al. | 717/107 |
| 8,381,180 B2* | 2/2013 | Rostoker | 717/120 |
| 8,407,666 B2* | 3/2013 | Shenfield et al. | 717/107 |
| 8,464,213 B1* | 6/2013 | Stienstra et al. | 717/107 |
| 8,745,583 B2* | 6/2014 | Ronen et al. | 717/120 |
| 2002/0087947 A1* | 7/2002 | Kwon et al. | 717/120 |
| 2002/0107914 A1* | 8/2002 | Charisius et al. | 709/203 |
| 2002/0178252 A1* | 11/2002 | Balabhadrapatruni et al. | 709/223 |
| 2006/0212857 A1* | 9/2006 | Neumann et al. | 717/140 |
| 2007/0186007 A1 | 8/2007 | Field et al. | |
| 2007/0239600 A1 | 10/2007 | Lundberg et al. | |
| 2007/0250335 A1* | 10/2007 | Hodges et al. | 705/1 |
| 2007/0297755 A1 | 12/2007 | Holt et al. | |
| 2008/0120596 A1 | 5/2008 | Kothari et al. | |
| 2008/0127065 A1* | 5/2008 | Bryant et al. | 717/109 |
| 2008/0172632 A1 | 7/2008 | Stambaugh | |
| 2008/0177612 A1* | 7/2008 | Starink et al. | 705/8 |
| 2008/0183538 A1 | 7/2008 | Hamadi et al. | |
| 2008/0201715 A1 | 8/2008 | Breiter et al. | |
| 2009/0089752 A1* | 4/2009 | Tristram | 717/120 |

OTHER PUBLICATIONS

Curbera, et al., "Bite: Workflow Composition for the Web", Springer-Verlag 2007; [retrieved on Jan. 23, 2012]; Retrieved from Internet <URL:http://www.springerlink.com/content/0575313210780121/fulltext.pdf>; pp. 94-106.*

Yu, Buyya, "A Novel Architecture for Ealizing Grid Workflow using Tuple Spaces", Proceedings fo the Fifth IEEE/ACM International Workshop on Grid Computing (GRID'04); [retrieved on Jan. 23, 2012]; Retrieved from Internet <URL:http://ieeexplore.ieee.org/stamp/stamp.jsp?tp=&arnumber=1382823>; pp. 1-10.*

Sugiyama, "Object Make: A Tool for Construcitng Software Systems from Existing Software Components", 1995 ACM; [retrieved on Jun. 29, 2012]; Retrieved from Internet <URL:http://dl.acm.org/citation.cfm?id=211826>;pp. 128-136.*

Zhou, et al., "A Rule-based Component Customization Technique for QoS Properties", 2004 IEEE; [retrieved on Jun. 14, 2014]; Retrieved from Internet <URL:http://ieeexplore.ieee.org/stamp/stamp.jsp?tp=&arnumber=1281770>;pp. 1-2.*

Chafle, et al., "Improved Adaptation of Web Service Compositions Using Value of Changed Information", 2007 IEEE; [retrieved on Jun. 14, 2014]; Retrieved from Internet <URL:http://ieeexplore.ieee.org/stamp/stamp.jsp?tp=&arnumber=4279672>;pp. 1-8.*

Diaz, et al., "A Language for End-User Web Augmentation: Caring for Producers and Consumers Alike"; 2013 ACM; [retrieved on Jun. 14, 2014]; Retrieved from Internet <URL:http://dl.acm.org/citation.cfm?id=2460383>;pp. 9:1-9:51.*

Yu, "A Framework for Rapid Integration of Presentation Components"; 2007 ACM; [retrieved on Jun. 14, 2014]; Retrieved from Internet <URL:http://dl.acm.org/citation.cfm?id=1242572>;pp. 923-932.*

Ben-Natan, Ron, "XML Glue: An XML Workflow and Integration Layer for Telecommunication Providers", Retrieved at <<http://xml.sys-con.com/node/40356>>, Feb. 22, 2002, pp. 5.

Beletski, Oleg, "End User Mashup Programming Environments", Retrieved at <<http://www.tml.tkk.fi/Opinnot/T-111.5550/2008/End%20User%20Mashup%20Programming%20Environments_p.pdf>>, Apr. 11, 2008, pp. 14.

"Presto 2.0 The Enterprise Mashup Platform", Retrieved at <<http://www.jackbe.com/downloads/presto_20_datasheet.pdf>>, pp. 4.

"Shelta Announces Availability of Skelta Workflow.NET 2004", Retrieved at <<http://www.skelta.com/company/2004/skelta-workflow-2004.aspx>>, Nov. 15, 2004, p. 1.

Jhingran, et al., "Enterprise Information Mashups: Integrating Information, Simply", Retrieved at <<http://www.vldb.org/conf/2006/p3-jhingran.pdf>>, VLDB '06, Sep. 12-15, 2006, Seoul, Korea, pp. 3-4.

Maximilien, et al., "Swashup: Situational Web Applications Mashups", Retrieved at <<http://maximilien.org/publications/papers/2007/Maximilien+Ranabahu+Tai07.pdf>>, OOPSLA'07, Oct. 21-25, 2007, Montreal, Quebec, Canada, pp. 2.

"From Business Need to Business Mashup in Three Simple Steps", Retrieved at <<http://www.serena.com/mashups/docs/3-steps-to-business-mashups.brief.pdf>>, pp. 1-6.

Jackson, et al., "Subspace: Secure Cross Domain Communication for Web Mashups", Retrieved at <<http://research.microsoft.com/~helenw/papers/subspace.pdf?0sr=ar>>, WWW, May 8-12, 2007, Banff, Alberta, Canada, pp. 10.

Ennals, et al., "MashMaker: Mashups for the Masses", Retrieved at <<http://berkeley.intel-research.net/rennals/pubs/sigmod035d-ennals.pdf>>, SIGMOD, 2007, Jun. 11-14, 2007, Beijing, China, pp. 3.

Altinel, et al., "Damia—A Data Mashup Fabric for Intranet Applications", Retrieved at <<http://www.vldb.org/conf/2007/papers/demo/p1370-altinel.pdf>>, VLDB 2007, Sep. 23-28, 2007, Vienna, Austria, pp. 1370-1373.

* cited by examiner

WORKFLOW ENGINE FOR EXECUTION OF WEB MASHUPS

BACKGROUND

In Web development, the term "Web mashup" is often used to describe a Web application that combines content from multiple sources to provide a new and distinct service to a user. Content used in mashups is often sourced from third party Web services via an application programming interface (API) or other interface. The entities involved in executing a mashup typically include: (1) content providers, such as third-party Web service providers, that make content available; (2) a Web site ("the mashup site") that facilitates access to a mashup that combines content obtained from the third-party Web service providers; and (3) a client Web browser that acts as a user interface to the mashup and that may actually execute the mashup using a client-side Web language such as Javascript. Web mashups are also sometimes referred to as Web application hybrids.

Many Web mashups are structured such that content obtained from at least one third-party Web service is provided as input to at least another third-party Web service or such that content obtained from two or more third-party Web services must be combined prior to further processing or presentation of results to a user. In fact, numerous such content dependencies can exist within a single Web mashup. The existence of these content dependencies can make mashups extremely difficult to program and improper handling of such content dependencies during development can lead to unreliable performance at runtime. Furthermore, since it is impossible to predict during development how long it will take to obtain content from any particular Web service at runtime, the sequence in which Web service calls are executed by a Web mashup cannot be optimized to improve performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is described herein for executing an application, such as a Web mashup, on a computer. In accordance with the method, an application definition is obtained. The application definition is parsed to identify components, wherein each component comprises a distinct unit of execution within the application. Programming logic and metadata associated with each type of component identified in the application definition is then obtained. Executable versions of the identified components are then generated using at least the programming logic and metadata obtained for the corresponding component type. Execution of each of the executable components is then managed.

Managing execution of each of the executable components may include executing of one or more of the executable components asynchronously. Initiating execution of one or more of the executable components asynchronously may include identifying one or more executable components that are not dependent on any other executable component for input based on information in the application definition and initiating execution of the identified executable component(s).

Managing execution of each of the executable components may also include determining that a first executable component is dependent on one or more other executable components for input based on information in the application definition and initiating execution of the first executable component only after the one or more other executable components are determined to be in a completed state.

Managing execution of each of the executable components may further include initiating execution of at least one of the executable components responsive to determining that only a portion of the total input to be provided to the executable component is available.

A computer program product is also described herein. The computer program product comprises a computer-readable medium having computer program logic recorded thereon for enabling a processing unit to execute an application, such as a Web mashup. The computer program logic includes first means, second means, third means, fourth means and fifth means. The first means are for enabling the processing unit to obtain an application definition. The second means are for enabling the processing unit to parse the application definition to identify components, wherein each component comprises a distinct unit of execution within the application. The third means are for enabling the processing unit to obtain programming logic and metadata associated with each type of component identified in the application definition. The fourth means are for enabling the processing unit to generate executable versions of the identified components using at least the programming logic and metadata obtained for the corresponding component type. The fifth means are for enabling the processing unit to manage execution of each of the executable components.

The fifth means may include means for enabling the processing unit to initiate execution of one or more of the executable components asynchronously. Such means may comprise for example means for enabling the processing unit to identify one or more executable components that are not dependent on any other executable component for input based on information in the application definition and to initiate execution of the identified executable component(s).

The fifth means may also include means for enabling the processing unit to determine that a first executable component is dependent on one or more other executable components for input based on information in the application definition and to initiate execution of the first executable component only after the one or more other executable components are determined to be in a completed state.

The fifth means may further include means for enabling the processing unit to initiate execution of at least one of the executable components responsive to determining that only a portion of the total input to be provided to the executable component is available.

A method for executing a Web mashup on a computer is also described herein. In accordance with the method, a plurality of executable components is generated, wherein each component comprises a distinct unit of execution within the Web mashup and wherein at least one executable component includes a request to a Web service. An order of execution of each of the plurality of executable components is then managed at runtime in accordance with identified input/output dependencies between the executable components.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
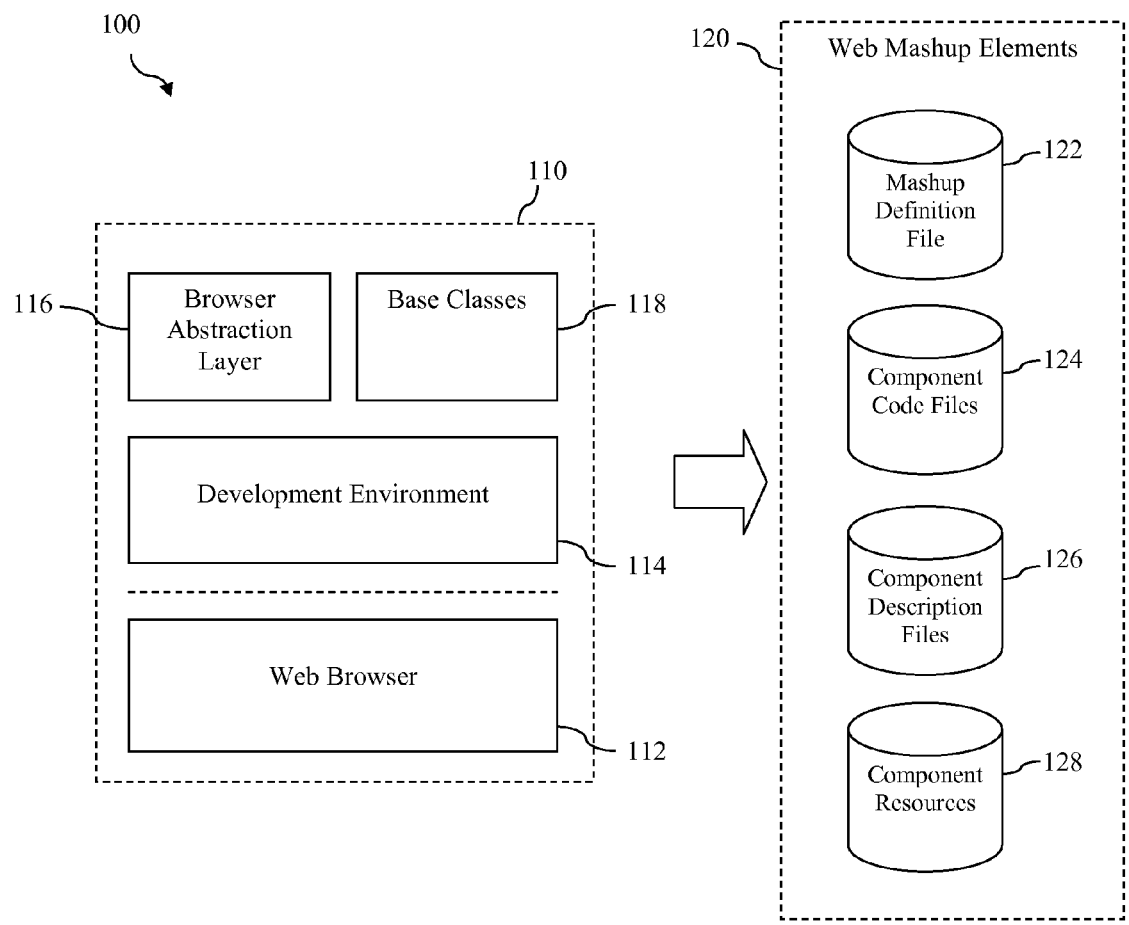
FIG. 1 is a block diagram of an example system for developing a Web mashup that may be executed by an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

A software-implemented workflow engine is described herein that executes a Web mashup within the context of a Web browser running on a client computer. The workflow engine is configured to parse a Web mashup definition obtained from a remote server to identify distinct units of execution within the Web mashup, referred to herein as components. The workflow engine is further configured to obtain programming logic and metadata associated with each type of component identified in the Web mashup definition from the remote server and to use such information to generate executable versions of the identified components. Finally, the workflow engine is configured to run each of the executable components, thereby executing the Web mashup.

As will be described in more detail herein, the workflow engine is advantageously configured to manage the order of execution of each of the executable components so that the Web mashup runs in an optimized and reliable fashion. For example, the workflow engine can initiate multiple executable components asynchronously, while also managing the execution sequence to ensure that content dependencies between the executable components are properly resolved. The workflow engine can also run certain executable components in an incremental fashion such that input to those executable components can be processed as soon as it becomes available.

Although embodiments of the present invention are described herein as being applicable to the execution of Web mashups, persons skilled in the relevant art(s) will readily appreciate that the systems and methods described herein can generally be applied to the execution of any type of software-based application or service that can be defined as, or organized into, a collection of distinct units of execution. Furthermore, although embodiments of the present invention are describe as operating within the environment of a Web browser running on a client computer, persons skilled in the relevant art(s) will readily appreciate that embodiments of the invention may operate in other environments suitably configured to execute software-based applications or services.

B. Example Web Mashup Development Environment

As will be described in more detail herein, an embodiment of the present invention comprises a workflow engine that executes a Web mashup within the context of a Web browser running on a client computer. However, before describing this embodiment, one manner in which such a Web mashup may be developed will first be described in reference to FIG. 1. In particular, FIG. 1 is a block diagram of an example system 100 for developing a Web mashup that may subsequently be executed by an embodiment of the present invention. As shown in FIG. 1, system 100 includes a Web browser 112 executing on a client computer 110 and a development environment 114 hosted within Web browser 112.

Web browser 112 comprises a software application that enables a user to display content and interact with applications that are accessible via the Internet or some other network. Web browser 112 may comprise, for example, any commercially-available or publicly-available Web browser, including but not limited Internet Explorer® (published by Microsoft Corporation of Redmond, Wash.), Mozilla® Firefox® (published by Mozilla Corporation of Mountainview, Calif.), or Safari® (published by Apple Computer of Cupertino, Calif.). However, these examples are not intended to be limiting. Client computer 110 may comprise a personal computer or any other processor-based system or device capable of running a Web browser.

Development environment 114 represents programming logic that has been downloaded from a remote server by Web browser 112 for execution within the context of Web browser 112. When executed, development environment 114 provides a means by which a user can create, edit, run and save Web mashups via Web browser 112. In one embodiment, development environment 114 comprises programming logic developed by Microsoft Corporation of Redmond, Wash., and made accessible to users via the Microsoft® Popfly™ Website (http://www.popfly.com), although the invention is not so limited.

In an embodiment, development environment 114 allows a user to create a Web mashup by selectively combining distinct units of execution referred to herein as components. For example, a user may combine components by interacting with graphic representations of the components (e.g., icons) within the context of a graphical user interface (GUI) provided by development environment 114. Interacting with the graphic representations of the components may comprise, for example, placing graphic representations of the components onto a design surface of the GUI and selectively connecting input and output nodes associated with the graphic representations so placed. The connection of the output node of a first component to the input node of a second component may be used to indicate that one or more values output from the first component should be provided as an input to the second component.

A component may comprise, for example, a call to a third party Web service as well as wrapper logic for managing the manner in which the Web service is called and for properly formatting data returned therefrom. A component may alternatively comprise data processing logic or logic for displaying mashup results to a user such as via a GUI.

Depending upon the implementation, development environment 114 may allow the user to select from among a plurality of basic component types, wherein each component type is represented by a default component having certain default settings or parameters. The user may then customize the default component to generate a customized component by, for example, selectively altering the default settings or parameters. Altering the default settings or parameters may include, for example, specifying or modifying an operation to be performed by a component, specifying or modifying one or more values to be input to a component wherein such values may be provided from another component or specified by the user, or specifying or modifying one or more properties relating to how output is to be presented by a component. A single basic component type can thus be used to create a plurality of customized components within a mashup.

As further shown in FIG. 1, system 100 also includes a browser abstraction layer 116 and base classes 118. Browser abstraction layer 116 comprises programming logic that interprets function calls generated by development environment 114 such that the function calls are received in a format that is suitable for execution by Web browser 112. This ensures that development environment 114 will operate in a consistent and reliable manner across a variety of different Web browser types and also makes development easier by not requiring a developer to be concerned with Web-browser-specific implementation details. Base classes 118 comprise functions that may be called by development environment 114 to perform certain useful operations such as, for example, making Web requests or processing strings or arrays.

In addition to certain functions described above, development environment 114 further allows a user to save a mashup after it has been created or updated. The mashup may be saved, for example, to a remote server for subsequent access by the user or other users. As further shown in FIG. 1, a saved mashup comprises a number of different elements 120. Elements 120 include a mashup definition file 122, component code files 124 and component description files 126. Elements 120 may also optionally include component resources 128.

Mashup definition file 122 is a file that includes information that identifies each of the components that comprise the mashup. Mashup definition file 122 may also include additional information associated with each identified component, including for example, an operation to be performed by a component, one or more values to be input to a component, one or more properties relating to how output is to be presented by a component, and information indicating whether one or more values output from a component should be used as an input to another component. In one embodiment, the information in mashup definition file 122 is formatted in accordance with a markup language such as XML (Extensible Markup Language), although this is only an example.

Component code files 124 comprise files that include actual programming logic used to execute each type of component included within the Web mashup. In one embodiment, the programming logic is implemented using a scripting language such as Javascript, although this example is not intended to be limiting.

Component description files 126 comprise files that include metadata associated with each type of component included within the Web mashup. In one embodiment, at least two kinds of metadata are stored within each component description file: input/output format metadata and descriptive metadata. Input/output format metadata defines a specific set of input/output formats that can be used with a particular component type. Input/output format metadata may be used to ensure that data output from a first component for input to a second component is in a format that is compatible with the second component or to perform a conversion function when an incompatibility is detected. An example of incompatible input/output formats includes strings and arrays. Input/output format metadata may also be used for enforcing constraints (e.g., ensuring a value is within a range, is present when required, is non-zero, is positive, and/or many others), setting default values and the like.

Descriptive metadata may comprise data that is used by development environment 106 to provide high-level guidance to programming logic within development environment 106 and/or to a user about the kinds of things that a particular type of component is capable of doing. For example, descriptive metadata may include a list of operations that a particular type of component can perform, a brief description of code that may be used to automatically generate documentation, or a set of default values that development environment 106 will load when a particular type of component is called.

In one embodiment, the information stored in each component description file 126 is formatted in accordance with a markup language such as XML, although the invention is not so limited.

Component resources 128 comprise other resources, such as images, logos, or the like that may optionally be associated with a particular type of component. Such resources may be used, for example, to graphically represent a component type in a GUI provided by development environment 114.

The foregoing is merely an example of one development environment that may be used to develop a Web Mashup that may be executed in accordance with embodiments to be described herein. However, this example is not intended to be limiting and other development environments, including more code-driven development environments, may be used to develop the Web mashup.

C. Example Web Mashup Runtime Environment

Figure 2:
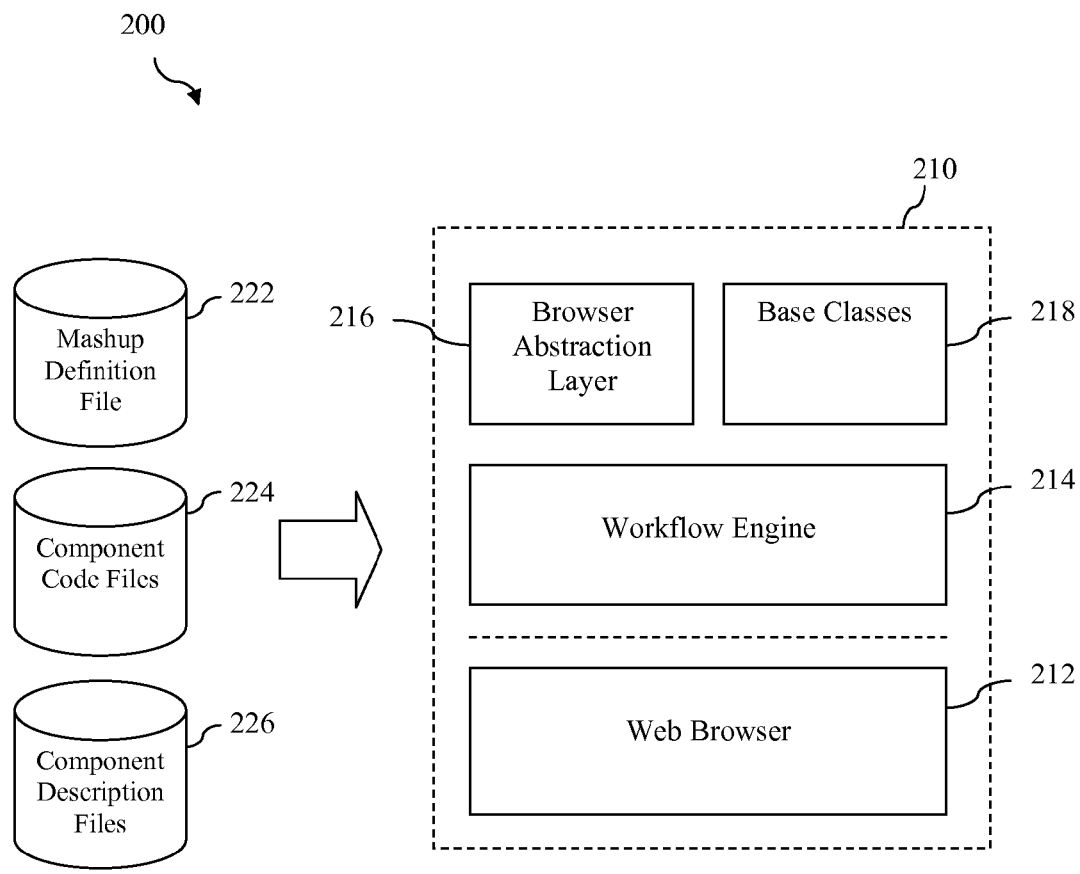
FIG. 2 is a block diagram of an example system for executing a Web mashup in accordance with an embodiment of the invention.

FIG. 2 depicts an example system 200 for executing a Web mashup in accordance with an embodiment of the present invention. The Web mashup run by system 200 may comprise, for example, a Web mashup developed using system 100 of FIG. 1 as described above, although the invention is not so limited.

As shown in FIG. 2, system 200 includes a Web browser 212 executing on a client computer 210 and a workflow engine 214 hosted within Web browser 212. Like Web browser 112 described above in reference to FIG. 1, Web browser 212 comprises a software application that enables a user to display content and interact with applications that are accessible via the Internet or some other network and may comprise, for example, any commercially-available or publicly-available Web browser. Client computer 210 may comprise a personal computer or any other processor-based system or device capable of running a Web browser.

Workflow engine 214 represents programming logic that has been downloaded from a remote server by Web browser 212 for execution within the context of Web browser 212. Workflow engine 214 may comprise, for example, Javascript programming logic, although the invention is not so limited. When executed, workflow engine 214 operates to execute a Web mashup in a manner that will be described in more detail herein. In one embodiment, workflow engine 214 comprises programming logic developed by Microsoft Corporation of Redmond, Wash., and made accessible to users via, for example, the Microsoft® Popfly™ Website (http://www.popfly.com), although the invention is not so limited.

As further shown in FIG. 2, system 200 also includes a browser abstraction layer 216 and base classes 218. Similar to browser abstraction layer 116 described above in reference to FIG. 1, browser abstraction layer 216 comprises programming logic that interprets function calls generated by workflow engine 214 such that the function calls are received in a format that is suitable for execution by Web browser 212. Like base classes 118 described above in reference to FIG. 1, base classes 218 comprise functions that may be called by workflow engine 214 to perform certain useful operations such as, for example, making Web requests or processing strings or arrays.

To execute a Web mashup, certain inputs must be provided to workflow engine 214. As shown in FIG. 2, these inputs include at least a mashup definition file 222, component code files 224 and component description files 226. These files are analogous to mashup definition file 122, component code files 124 and component description files 126 as described above in reference to FIG. 1. As will be described in more detail herein, workflow engine 214 obtains these files from a remote server as part of the process of executing the Web mashup.

D. Example Method for Web Mashup Execution

The manner in which system 200 executes a Web mashup will now be described in detail with reference to flowchart 300 of FIG. 3. Although the method of flowchart 300 will be described herein in reference to the elements of system 200, the method is not limited to that embodiment.

Figure 3:
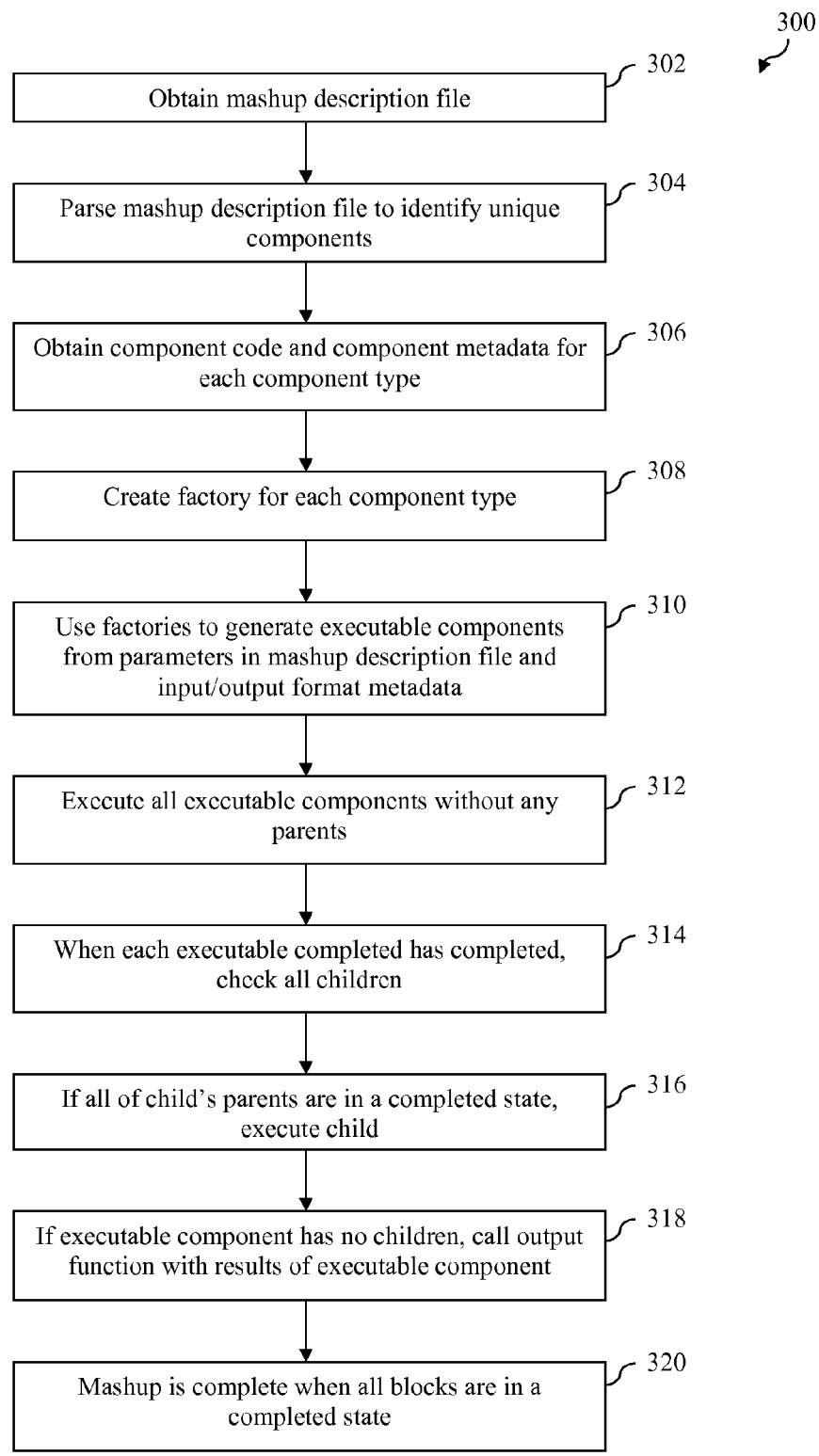
FIG. 3 depicts a flowchart of a method for executing a Web mashup in accordance with an embodiment of the present invention.

As shown in FIG. 3, the method of flowchart 300 begins at step 302 in which workflow engine 214 executing within the context of Web browser 212 obtains mashup definition file 222. This step may encompass passing a request for mashup definition file 222 from workflow engine 214 to a remote server and receiving the file back from the remote server after the request has been processed. The mashup definition file may be received and loaded as an object by the workflow engine. Although reference is made herein to a "mashup definition file," persons skilled in the relevant art(s) will appreciate that, depending upon the implementation, a mashup definition may be obtained by workflow engine 214 in a form other than a file (e.g., as a stream of information or in some other form).

At step 304, workflow engine 214 parses mashup definition file 222 to identify unique components within the file. As noted above, a component may be thought of as a distinct unit of execution within the Web mashup. In addition to identifying unique components within mashup definition file 222, step 304 may also include parsing mashup definition file 222 to identify content dependencies between identified components. A content dependency exists when a first component requires as input data that is output from one or more other components. Step 304 may further include parsing mashup definition file 222 to identify certain parameters that will be used to generate an executable version of each component. Such parameters may include, for example, an operation to be performed by a component, one or more values to be input to a component and one or more properties relating to how output is to be presented to a user by a component.

At step 306, for each type of component identified in step 304, workflow engine 214 obtains component code and component metadata. As discussed above, in an embodiment of the present invention, multiple components may each be based on the same basic component type. Thus, although multiple components may be identified in step 304, a plurality of the identified components may be associated with only a single component type.

Component code is obtained by loading a component code file 224 associated with each component type while component metadata is obtained by loading a component description file 226 associated with each component type. Thus, this step may encompass passing a request for component code files 224 and component description files 226 from workflow engine 214 to a remote server and receiving the appropriate files back from the remote server after the request has been processed. Depending upon the implementation, the request may comprise a single request or multiple requests. Also, although reference is made herein to "component code files" and "component description files," persons skilled in the relevant art(s) will readily appreciate that, depending upon the implementation, component code and component metadata may be obtained by workflow engine 214 in a form other than a file (e.g., as a stream of information or in some other form).

At step 308, workflow engine 214 creates a factory for each component type. In an embodiment, creating a factory for a component type comprises creating or configuring programming logic that is capable of generating one or more executable components based on a component type.

At step 310, workflow engine 214 uses each factory created in step 308 to generate executable components corresponding to the components identified in step 304. In one embodiment, generation of an executable component includes modifying and or adding programming logic to the code associated with a basic component type to account for certain parameters associated with a component identified during step 304 as discussed above. Generation of an executable component may also include generating programming logic that formats data output from one executable component for input to another executable component in accordance with input/output format metadata associated with one or both components.

During steps 312, 314, 316 and 318, workflow engine 214 executes each of the executable components generated during step 310. In performing these steps, workflow engine 214 manages the order of execution of each of the executable components so that the Web mashup runs in an optimized and reliable fashion. For example, workflow engine 214 can initiate the execution of multiple executable components asynchronously, while also managing the execution sequence to ensure that content dependencies between the executable components are properly resolved. Details concerning each of these steps will now be provided.

At step 312, workflow engine 214 executes all executable components that do not have any parents. A parent of an executable component is any other executable component that outputs content that is used as input by the executable component. If an executable component does not have any parents, then it is not dependent on any other executable components for input and thus may be executed irrespective of the state of any other executable components. As discussed above, content dependencies between components may be determined by workflow engine 214 during step 304.

At shown at step 314, when the execution of an executable component has completed, workflow engine 214 checks each of the children of the executable component. A child of an executable component is any other executable component that uses as input content that is output by the executable component. As shown at step 316, if all of a child's parents are in a completed state, then workflow engine 214 executes the child. This is because all the content produced by the parents is available as input to the child. Otherwise, if even one of a child's parents is not in a completed state, the child remains pending in an unexecuted state.

As shown at step 318, if the execution of an executable component has completed and the component has no children, workflow engine 214 calls an output function with the results of the executable component. The output function may be, for example, a function that displays the results of the executable component in a certain format to a display area provided by Web browser 212. This output function is not limited to direct display of the results. Such a function could also perform any action utilizing the results, such as changing the channel of a television.

As shown at step 320, once all of the executable blocks have executed and are in a completed state, execution of the Web mashup by workflow engine 214 is complete.

As noted above, workflow engine 214 is advantageously configured to manage the order of execution of each of the executable components in a Web mashup so that the Web mashup runs in an optimized and reliable fashion. To achieve optimized execution, workflow engine 214 is also configured to run certain executable components in an incremental fashion such that input to those executable components can be processed as soon as it becomes available. This aspect of workflow engine 214 will now be further described in reference to flowchart 400 of FIG. 4.

Figure 4:
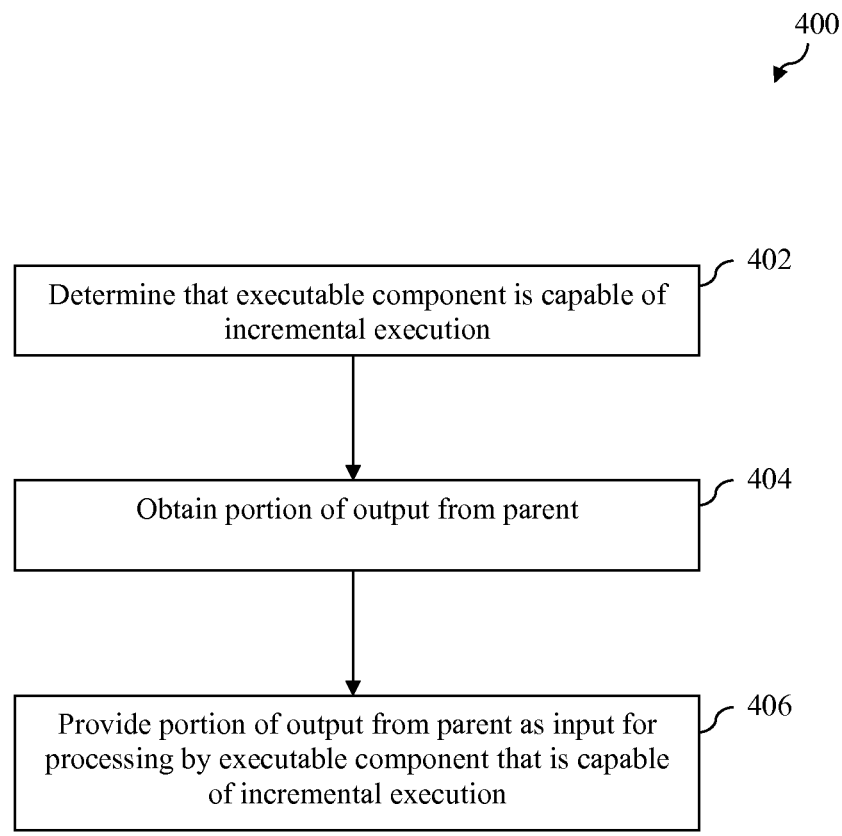
FIG. 4 depicts a flowchart of a method for incrementally executing a component within a Web mashup in accordance with an embodiment of the present invention.

In particular, FIG. 4 depicts a flowchart 400 of a method for incrementally executing a component within a Web mashup in accordance with an embodiment of the present invention. Although the method of flowchart 400 will be described herein in reference to the elements of system 200, the method is not limited to that embodiment.

As shown in FIG. 4, the method of flowchart 400 begins at step 402 in which workflow engine 214 determines that an executable component is capable of being executed incrementally. An executable component is capable of being executed incrementally if it is capable of operating on only a portion of the total input expected by the executable component to produce some corresponding output or perform some corresponding function. An executable component may be capable of being executed incrementally, for example, if the executable component can operate on a row of expected input data instead of an entire array of expected input data. An executable component may be capable of being executed incrementally if it includes a call to a Web service that can be called incrementally. For example, an executable component that can be executed incrementally may include a call to a geocoding service that converts input locations to geographic coordinates, wherein the geocoding service can be called incrementally for each location received as input as opposed to placing a single call only when all input locations have been received.

Workflow engine 214 may determine that an executable component is capable of incremental execution based on information associated with the component in mashup definition file 222 or based on metadata associated with a corresponding component type.

At step 404, workflow engine 214 receives a portion of the output data that will be produced by a parent of the executable component. It is assumed for the purposes of this example that the portion of the output data produced by the parent comprises an incremental portion of data that can be processed by the executable component. Thus, with continued reference to the examples provided above, the output produced by the parent may include a single row in an array of input data or a location in a set of locations to be provided as input to a geocoding service.

At step 406, workflow engine 214 provides the portion of output data received from the parent as input for processing by the executable component that is capable of incremental execution. The executable component can then process the input in an incremental fashion. Thus, with continued reference to the examples provided above, the executable component can process a single row in an array of input data or single location in a set of locations to be provided as input to a geocoding service.

By incrementally executing components that are so capable, workflow engine 214 can advantageously increase the speed of execution of a Web mashup by mitigating the effects of components that produce data for downstream consumption by other components in a slow and/or intermittent fashion.

Figure 5:
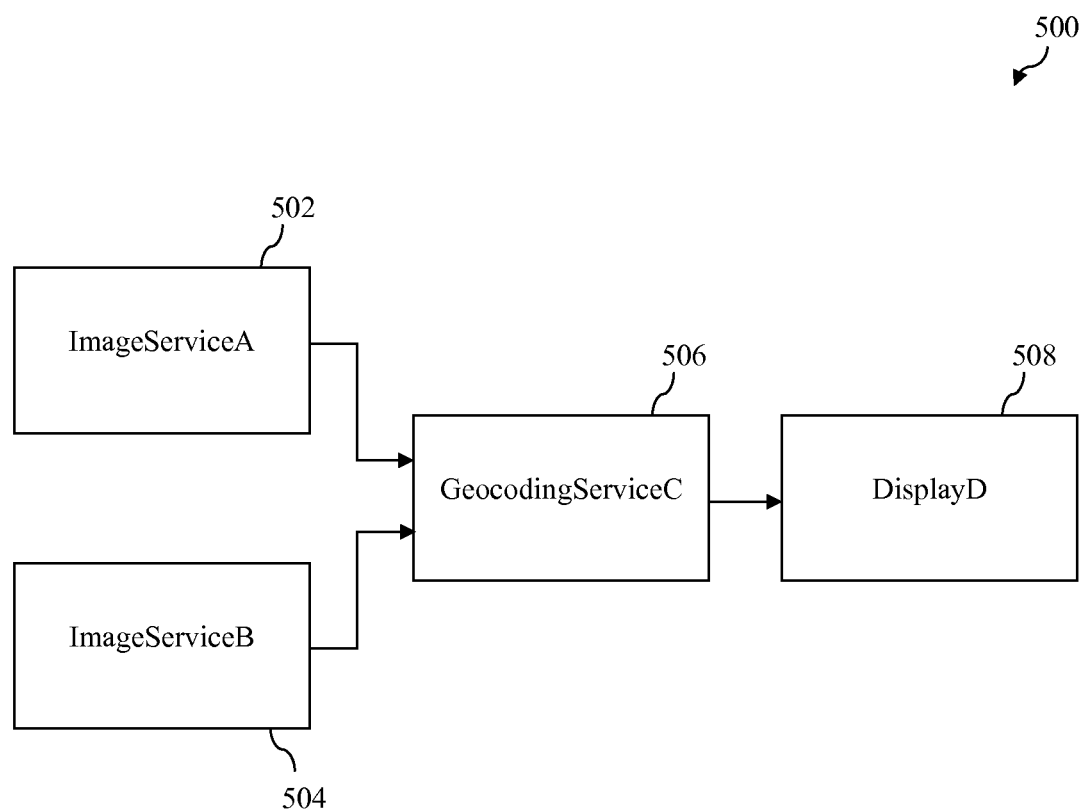
FIG. 5 depicts an example of a Web mashup comprising a plurality of components that may be executed by an embodiment of the present invention.

To illustrate some of the advantages of the foregoing methods, FIG. 5 depicts an example Web mashup 500 comprising a plurality of executable components that may be executed by a workflow engine in accordance with an embodiment of the present invention. As shown in FIG. 5, Web mashup 500 comprises an executable component 502 that obtains content from a Web service denoted ImageServiceA, an executable component 504 that obtains content from a Web service denoted ImageServiceB, an executable component 506 that provides content (e.g., location information) from executable components 502 and 504 to a Web service denoted GeocodingServiceC and obtains corresponding content (e.g., geographic coordinates) therefrom, and an executable component 508 that performs a display function denoted DisplayD based on the content obtained from executable component 506 (e.g., placing pushpins on a map based on the geographic coordinates returned from executable component 506).

In accordance with the foregoing methods, workflow engine 214 can initiate execution of executable components 502 and 504 simultaneously since neither component is dependent on another component for input. Furthermore, assuming that executable component 506 is capable of incremental execution, workflow engine 214 can incrementally and individually pipeline output from executable components 502 and 504 through executable component 506, irrespective of the progress of either executable component 502 or 504. Any output produced by executable component 506 can immediately be processed for display by executable component 508.

E. Example Computer System Implementation

Figure 6:
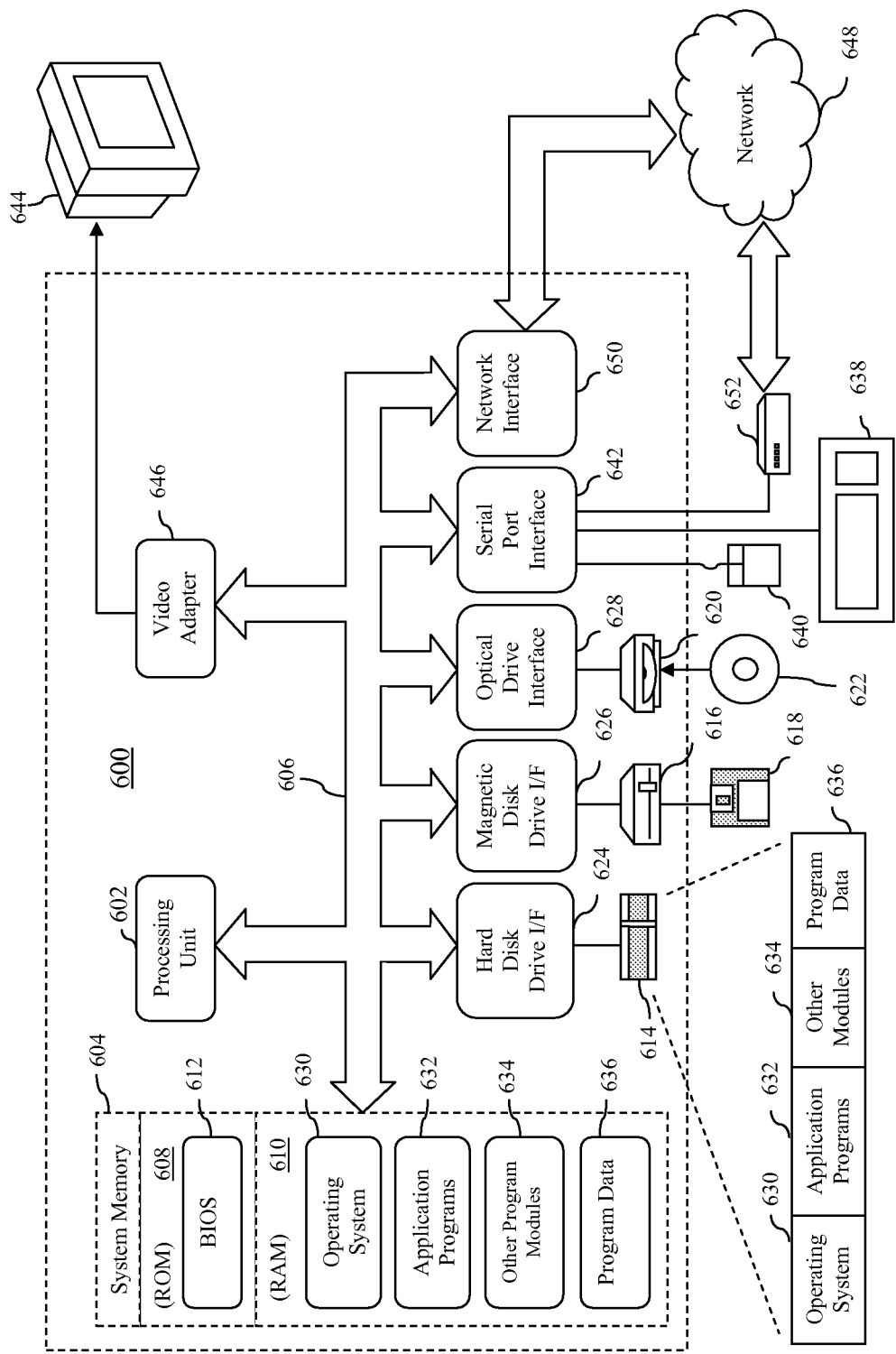
FIG. 6 depicts an example computer system that may be used to implement the present invention.

FIG. 6 depicts an exemplary implementation of a computer system 600 upon which various aspects of the present invention may be executed. Computer system 600 is intended to represent a general-purpose computing system in the form of a conventional personal computer.

As shown in FIG. 6, computer system 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer system 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, any of the various software-implemented elements depicted in FIGS. 1 and 2. Application programs 632 or program modules 634 may also include, for example, logic for implementing one or more of the steps of the flowcharts depicted in FIGS. 3 and 4. Thus each step illustrated in those figures may also be thought of as program logic configured to perform the function described by that step.

A user may enter commands and information into computer 600 through input devices such as keyboard 638 and pointing device 640. Other input devices (not shown) may include a microphone, joystick, game pad, satellite dish, scanner, or the like. These and other input devices are often connected to the processing unit 602 through a serial port interface 642 that is coupled to bus 606, but may be connected by other interfaces, such as a parallel port, game port, or a universal serial bus (USB).

A monitor 644 or other type of display device is also connected to bus 606 via an interface, such as a video adapter 646. Monitor 644 is used to present a GUI that assists a user/operator in configuring and controlling computer 600. In addition to the monitor, computer 600 may include other peripheral output devices (not shown) such as speakers and printers.

Computer 600 is connected to a network 648 (e.g., a WAN such as the Internet or a LAN) through a network interface 650, a modem 652, or other means for establishing communications over the network. Modem 652, which may be internal or external, is connected to bus 606 via serial port interface 642.

As used herein, the terms "computer program medium" and "computer-readable medium" are used to generally refer to media such as the hard disk associated with hard disk drive 614, removable magnetic disk 618, removable optical disk 622, as well as other media such as flash memory cards, digital video disks, random access memories (RAMs), read only memories (ROM), and the like.

As noted above, computer programs (including application programs 632 and other program modules 634) may be stored on the hard disk, magnetic disk, optical disk, ROM, or RAM. Such computer programs may also be received via network interface 650 or serial port interface 642. Such computer programs, when executed, enable computer 600 to implement features of the present invention discussed herein. Accordingly, such computer programs represent controllers of computer 600.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for executing an application comprising:

obtaining an application definition file that includes an application definition;

parsing the application definition to identify components and parameters associated with the components, each component comprising a distinct unit of execution within the application and being in a non-executable form, and the application definition including one or more first values to be input to at least one of the components identified, one or more properties relating to how output is to be presented from the at least one of the components identified, and information indicating whether one or more second values output from a first one of the identified components is to be used as an input to a second one of the identified components;

obtaining one or more component code files that include programming logic associated with each type of component identified in the application definition, the programming logic being configured to execute each type of component identified in the application definition;

obtaining one or more component description files that include metadata associated with each type of component identified in the application definition;

for each component type identified:

creating a factory; and using the factory to generate a plurality of executable versions of the identified components for the component type using at least the programming logic and the metadata obtained for the component type, each of the plurality of executable versions being generated by modifying the programming logic for the component type based on a respective one or more parameters of the identified parameters that are associated with a respective identified component of the identified components; and managing execution of each of the executable components, the application being created by selectively combining graphical representations of the identified components by a user via a graphical user interface, the application definition file and the one or more component description files being created in response to the user saving the created application via the graphical user interface.

2. The method of claim 1, wherein the application definition is formatted in accordance with a markup language.

3. The method of claim 1, wherein the application comprises a Web mashup and wherein at least one of the executable components includes a request to a Web service.

4. The method of claim 1, wherein the metadata associated with each type of component identified in the application definition comprises input/output format metadata and wherein generating executable versions of the identified components comprises generating logic that formats data output from one executable component for input to another executable component in accordance with the input/output format metadata.

5. The method of claim 1, wherein the metadata associated with each type of component identified in the application definition is formatted in accordance with a markup language.

6. The method of claim 1, wherein the programming logic associated with each type of component identified in the application definition file comprises Javascript programming logic.

7. The method of claim 1, wherein managing execution of each of the executable components comprises:
    initiating execution of one or more of the executable components asynchronously.

8. The method of claim 7, wherein initiating execution of one or more of the executable components asynchronously comprises:
    identifying one or more executable components that are not dependent on any other executable component for input based on information in the application definition; and
    initiating execution of the identified executable component(s).

9. The method of claim 1, wherein managing execution of each of the executable components comprises:
    determining that a first executable component is dependent on one or more other executable components for input based on information in the application definition; and
    initiating execution of the first executable component only after the one or more other executable components are determined to be in a completed state.

10. The method of claim 1, wherein managing execution of each of the executable components comprises:
    initiating execution of at least one of the executable components responsive to determining that only a portion of the total input to be provided to the executable component is available.

11. A computer program product comprising a computer-readable memory having computer program logic recorded thereon, which, when executed by a processing unit, performs operations to execute an application, the operations comprising:
    obtaining an application definition file that includes an application definition;
    parsing the application definition to identify components and parameters associated with the components, each component comprising a distinct unit of execution within the application and is being in a non-executable form, and the application definition including one or more first values to be input to at least one of the components identified, one or more properties relating to how output is to be presented from the at least one of the components identified, and information indicating whether one or more second values output from a first one of the identified components is to be used as an input to a second one of the identified components;
    obtaining one or more component code files that include programming logic associated with each type of component identified in the application definition, the programming logic being configured to execute each type of component identified in the application definition;
    obtaining one or more component description files that include metadata associated with each type of component identified in the application definition;
    for each component type identified:
        creating a factory; and
        using the factory to generate a plurality of executable versions of the identified components for the component type using at least the programming logic and the metadata obtained for the component type, each of the plurality of executable versions being generated by modifying the programming logic for the component type based on a respective one or more parameters of the identified parameters that are associated with a respective identified component of the identified components; and
    managing execution of each of the executable components, the application being created by selectively combining graphical representations of the identified components by a user via a graphical user interface, the application definition file and the one or more component description files being created in response to the user saving the created application via the graphical user interface.

12. The computer program product of claim 11, wherein the application definition is formatted in accordance with a markup language.

13. The computer program product of claim 11, wherein the application comprises a Web mashup and wherein at least one of the executable components includes a request to a Web service.

14. The computer program product of claim 11, wherein the metadata associated with each type of component identified in the application definition comprises input/output format metadata and wherein generating executable versions of the identified components using at least the programming logic and metadata obtained for the corresponding component type comprises generating logic that formats data output from one executable component for input to another executable component in accordance with the input/output format metadata.

15. The computer program product of claim 11, wherein the programming logic associated with each type of component identified in the application definition file comprises Javascript programming logic.

16. The computer program product of claim 11, wherein managing execution of each of the executable components comprises initiating execution of one or more of the executable components asynchronously.

17. The computer program product of claim 16, wherein managing execution of each of the executable components comprises identifying one or more executable components that are not dependent on any other executable component for input based on information in the application definition and initiating execution of the identified executable component(s).

18. The computer program product of claim 11, wherein managing execution of each of the executable components comprises determining that a first executable component is dependent on one or more other executable components for input based on information in the application definition and initiating execution of the first executable component only after the one or more other executable components are determined to be in a completed state.

19. The computer program product of claim 11, wherein managing execution of each of the executable components comprises initiating execution of at least one of the executable components responsive to determining that only a portion of the total input to be provided to the executable component is available.

20. A computer-implemented method for executing a Web mashup, comprising:
  obtaining a plurality of non-executable components and parameters associated with the plurality of non-executable components from an application definition file, the application definition file including one or more first values to be input to at least one of the non-executable components, one or more properties relating to how output is to be presented from the at least one of the non-executable components, and information indicating whether one or more second values output from a first one of the non-executable components is to be used as an input to a second one of the non-executable components;
  obtaining one or more component code files that include programming logic associated with each type of non-executable component obtained from the application definition file;
  obtaining one or more component description files that include metadata associated with each type of non-executable component obtained from the application definition file;
  for each non-executable component type obtained:
    creating a factory; and
    using the factory to generate a plurality of executable versions of the plurality of non-executable components for the non-executable component type using at least the programming logic and the metadata obtained for the non-executable component type, each non-executable component comprising a distinct unit of execution within the Web mashup and at least one executable component including a request to a Web service, and each of the plurality of executable versions being generated by modifying the programming logic for the non-executable component type based on a respective one or more parameters of the obtained parameters that are associated with a respective non-executable component of the plurality of non-executable components; and
  managing an order of execution of each of the plurality of executable components at runtime in accordance with identified input/output dependencies between the executable components,
  the Web mashup being created by selectively combining graphical representations of the non-executable components by a user via a graphical user interface, the application definition file and the one or more component description files being created in response to the user saving the created Web mashup via the graphical user interface.

* * * * *